Aug. 21, 1934.    E. MROSS    1,970,811
PORTABLE FOOD MIXER AND SUPPORT
Filed May 23, 1932
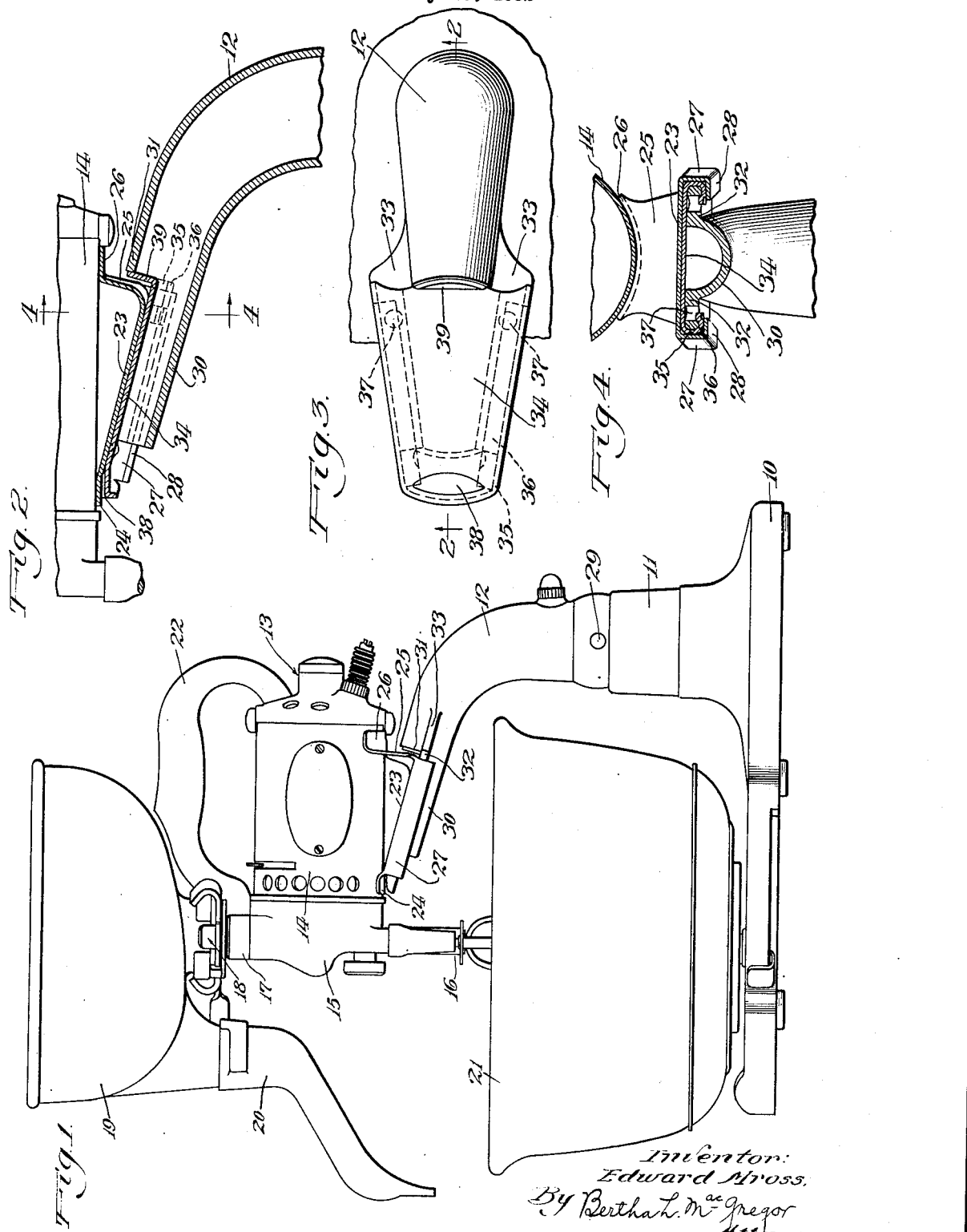
Inventor:
Edward Mross,
By Bertha L. McGregor
Attorney Patented Aug. 21, 1934

1,970,811

UNITED STATES PATENT OFFICE 1,970,811

PORTABLE FOOD MIXER AND SUPPORT

Edward Mross, Racine, Wis., assignor to Hamilton Beach Manufacturing Company, Racine, Wis., a corporation of Wisconsin Application May 23, 1932, Serial No. 612,883

3 Claims. (Cl. 259—1)

This invention relates to a portable, motor driven food mixer adapted to be removably supported on a standard.

The object of the invention is to provide means whereby the food mixer may be firmly seated on a support, without being permanently fastened thereto, in such manner that the mixer will be held in proper position for its operative purpose and will be carried by the support when the latter is pivotally moved relatively to its base.

Another object of the invention is to produce a portable food mixer and support in which the motor of the mixer and the upper end of the standard are provided with cooperating parts adapted for sliding engagement with each other. The food mixer is positioned by a sliding rearward movement on the support, and automatically seats itself. It may be removed by being slidably moved forwardly on the support.

In the drawing:—

Fig. 1 is a side elevation of a combination food mixer and fruit juice extractor mounted on a support embodying my invention.

Fig. 2 is a fragmentary, longitudinal, sectional view of the support and mixer mounted thereon, taken on the line 2—2 of Fig. 3.

Fig. 3 is a plan view of the support.

Fig. 4 is a vertical sectional view taken on the line 4—4 of Fig. 2.

As illustrative of the device in which is embodied the invention sought to be protected by this application, I have shown in Fig. 1 a combination food mixer and juice extractor, in which the horizontally disposed base is indicated at 10, an upright socket, integral with the base, at 11, a pivotally mounted arm at 12, and a motor-driven food mixer, detachably mounted on the arm, at 13. The food mixer comprises a motor 14, carrying a gear casing 15, and a detachable agitator or beater unit 16. The motor is operatively connected with the agitators beneath the gear casing and with the juice extractor above the gear casing. The gear casing 15 is provided with a socket 17 which receives the coupling which operatively and removably connects the reamer drive shaft to a driven shaft in the gear casing. The reamer drive shaft and coupling carry the supporting and clamping device 18 for the bowl 19. The bowl is provided with a spout 20. The food mixer bowl is indicated at 21, and a handle on the motor, at 22.

It will be understood that the invention herein shown, described and claimed may be embodied in food mixers of various constructions, and is not limited to the particular combination in which it is illustrated herein, in Fig. 1.

Novel features of construction of the combination food mixer and juice extractor, not claimed herein, are the subject of applications co-pending herewith.

Referring now more particularly to the construction which is the subject of this invention, namely, the means for mounting the mixer 13 on the support 12, that part of the mounting which is attached to the motor 14 comprises an inclined plate 23, wider at its rearward end than at its forward end, and having its forward end 24 shaped to conform to the under surface of the motor to which it is spot welded. At its rearward end the inclined plate 23 merges into an upturned wall 25 which terminates in a horizontally disposed flange 26 which is curved to conform to the curved under side of the motor and is welded or otherwise secured thereto. The plate 23 is provided along each of its side margins with a depending flange 27 which is turned inwardly as indicated at 28. The mounting plate 23 with its ends 24 and 26 is preferably as long as the motor body, exclusive of the gear casing and end plate.

Referring now to that part of the mounting which is embodied in the support, I preferably cast the curved hollow arm 12 and pivotally mount the same at its lower end on the pivot 29 in the socket 11. At its upper end the lower half 30 of the casting is extended beyond the end 31 of the upper half. The extended portion 30 presents a concave upper surface, gradually diminishing in width toward its free end, and said part 30 has a flange 32 formed on each of its side margins. The rearward ends of the flanges 32 merge into the sides of the support 12 as indicated at 33.

A metal plate 34 covers the extension member 30 and flanges 32 and has its side edges turned downwardly and then inwardly to embrace the sides of the casting flanges 32, as indicated at 35 and 36, the inturned flanges 36 being pressed upwardly into the apertures 37 in the flanges 32 to hold the plate 34 firmly in place on the casting end.

The forward end 38 of the plate 34 is curved transversely and is disposed at a slight angle to the plate 34. A semi-circular disc 39 extends upwardly from the rearward edge of the plate 34, closing the open end of the upper half 31 of the standard 12.

The size of the plate 34, including its flanges 35, 36, is such that it fits beneath the plate 23, between the side flanges 27 and above the inturned flanges 28. The side edges of the plates 23 and 34 preferably extend at an angle of not less than 14° to the longitudinal median line of the plates. As shown in the drawing, the angle is about 18°.

The mounting member, attached to the motor, is positioned on the mounting end of the support 12 by seating the rearward end of the plate 23 on the forward end 38 of the plate 34, and sliding the plate 23 on the plate 34 until the flanges 27 engage the flanges 35 by reason of the wedge form of the parts. Preferably this engagement takes place before the motor mounting has slidably moved sufficiently to bring the upright wall 25 into contact with the disc plate 39; that is, I prefer to make the relative dimensions of the plates and flanges such that there will be clearance, as indicated in Fig. 2, between the parts 25 and 39. Since these parts do not contact, I am assured that the flanged plates are in proper engagement throughout their length.

The telescopic engagement of the two inclined, flanged plates provides a firm, non-vibratory mounting, which properly supports the mixer and motor for operative purposes, and permits easy removal and replacement. The angle at which the side edges of the wedge-like plates are disposed, relatively to the median longitudinal line of the plates, is such that binding of the parts is obviated. The inclination of the plates 23 and 34 has also been calculated to produce an efficient mounting which may be easily manipulated. The weight of the motor and of the beaters causes the motor to seat firmly on the support. The mixer may be removed by the operator with one hand, by merely sliding the food mixer forwardly on the support arm. No screws or other fastening devices are needed for retaining the motor in proper position on the arm.

The direction of rotation of the motor shaft is predetermined in the manufacture of the motor so that the beater shafts will be rotated in their proper opposite directions. A reversal of the direction of rotation of the beaters tends to pull the motor forwardly on its seat.

Changes may be made in details of construction without departing from the scope of my invention and I do not intend to be limited to the exact form shown and described, except as set forth in the appended claims.

I claim:—

1. A food mixer comprising a base, an arm on the base having an upwardly inclined bearing surface on its end, a portable motor and depending agitator, the motor being provided with a surface inclined downwardly from that end of the motor carrying the agitator, said inclined surface being adapted to bear slidingly on the inclined end of the arm, means on the inclined surface of the motor for engaging the arm and preventing movement of the motor laterally of the arm, the inclination of the engaging surfaces being such that the motor is supported in horizontal position and automatic movement of the motor longitudinally of the arm while the motor is being operated is prevented.

2. A food mixer comprising a base, an arm on the base having an upwardly inclined bearing surface on its end, a portable motor and depending agitator, the motor being provided with a flanged plate having a surface inclined downwardly from that end of the motor carrying the agitator, said member being adapted to bear slidingly on the inclined end of the arm, the sliding movement being limited by the engagement of the flanges with the side edges of the inclined end of the arm, whereby the motor is supported in horizontal position and is removable from the support by sliding the motor forwardly on the arm.

3. The combination of a portable, motor driven food mixer having a flanged plate secured to its under surface, with a support comprising a cast metal, tubular, curved arm, the arm terminating in an extension semi-circular in cross-section, and its upper surface concave, laterally extending flanges at the sides of the extension, and a metal plate, covering said extension and flanges, adapted to fit beneath the flanged plate and to engage the flanges when the mixer has been moved into its supported position.

EDWARD MROSS.